United States Patent
Grover et al.

(10) Patent No.: US 8,826,259 B2
(45) Date of Patent: Sep. 2, 2014

(54) METHOD AND DEVICE FOR UPGRADING SOFTWARE IN A CONSUMER PRODUCT

(75) Inventors: Rajesh Grover, Singapore (SG); Jeroen Koster, Singapore (SG); Jeroen Steenblik, Singapore (SG); Imran Husain, Singapore (SG)

(73) Assignee: Koninklijke Philips N.V., Eindhoven (NL)

( * ) Notice: Subject to any disclaimer, the term of this patent is extended or adjusted under 35 U.S.C. 154(b) by 1141 days.

(21) Appl. No.: 12/438,585

(22) PCT Filed: Aug. 24, 2007

(86) PCT No.: PCT/IB2007/053390
§ 371 (c)(1),
(2), (4) Date: Feb. 24, 2009

(87) PCT Pub. No.: WO2008/026139
PCT Pub. Date: Mar. 6, 2008

(65) Prior Publication Data
US 2010/0017793 A1 Jan. 21, 2010

(30) Foreign Application Priority Data
Aug. 29, 2006 (EP) ..................................... 06119668

(51) Int. Cl.
*G06F 9/44* (2006.01)
*G06F 9/445* (2006.01)

(52) U.S. Cl.
CPC ... *G06F 8/65* (2013.01); *G06F 8/61* (2013.01); *G06F 8/665* (2013.01); *G06F 9/445* (2013.01)
USPC ............................. 717/168; 717/169; 717/175

(58) Field of Classification Search
CPC .............. G06F 9/44; G06F 9/445; G06F 8/65
USPC .......................................... 717/168, 169, 175
See application file for complete search history.

(56) References Cited

U.S. PATENT DOCUMENTS

| | | | |
|---|---|---|---|
| 2004/0034861 A1* | 2/2004 | Ballai | 719/321 |
| 2005/0020308 A1* | 1/2005 | Lai | 455/558 |
| 2005/0240919 A1 | 10/2005 | Kim et al. | |
| 2006/0020938 A1 | 1/2006 | Elcock et al. | |
| 2006/0069840 A1* | 3/2006 | Corbett et al. | 710/313 |
| 2006/0092323 A1 | 5/2006 | Feeler et al. | |
| 2006/0117170 A1* | 6/2006 | Cheng | 713/2 |
| 2006/0130046 A1* | 6/2006 | O'Neill | 717/168 |
| 2006/0265419 A1* | 11/2006 | Forstall et al. | 707/102 |

FOREIGN PATENT DOCUMENTS

| | | |
|---|---|---|
| GB | 2400194 A | 10/2004 |
| JP | 62242275 A | 10/1987 |
| JP | 2003303028 A | 10/2003 |
| JP | 2006202206 A | 8/2006 |
| WO | 2006003538 A1 | 1/2006 |

\* cited by examiner

*Primary Examiner* — Jonathan C Teixeira Moffat
*Assistant Examiner* — Lynda Dinh
(74) *Attorney, Agent, or Firm* — Jones Day (57) ABSTRACT

A non-volatile storage device and consumer product are provided which co-operate to upgrade the software in the consumer product where the consumer product stores predetermined information regarding the consumer product on the storage device. The storage device is transferred to a computer product connected to the Internet. The predetermined information is used to acquire upgrade software from a remote server automatically without the user requiring detailed knowledge of the consumer product. The upgrade software is stored on the storage device, which is then transferred back to the consumer product. The consumer product upgrades the software using the upgrade software.

16 Claims, 6 Drawing Sheets

METHOD AND DEVICE FOR UPGRADING SOFTWARE IN A CONSUMER PRODUCT

FIELD OF THE INVENTION

The invention relates to a method for upgrading software in a consumer product.

The invention further relates to a consumer product with upgradeable software.

The invention further relates to a non-volatile storage device for use in upgrading software in a consumer product.

The invention further relates to a method for operating a consumer product for upgrading of software in the consumer product.

The invention further relates to a method for operating a computer product for upgrading of software in a consumer product.

The invention further relates to a program element.

The invention further relates to a computer-readable medium.

BACKGROUND OF THE INVENTION

Consumer products such as a Set-Top-Boxes, digital video recording devices, mobile phones, DVD players/recorders, televisions and MP3 players are generally controlled by embedded software or firmware. Such software is required to handle an ever increasing number of formats for audio-video content and will therefore need to be updated or upgraded to ensure that a consumer product does not become obsolete in a short period of time. Furthermore, since such software is quite complex it can occur that untested portions of the software may comprise errors, such errors are often termed bugs. Such software bugs should ideally be corrected by upgrading the software. Therefore it is beneficial to be able to upgrade the software in a consumer product. However, one problem is that consumer products do not generally have a suitable manner of upgrading the software embedded in the consumer product.

In UK patent application GB 2400194A a method is disclosed for upgrading software in a consumer product. A consumer product, such as a mobile phone, digital radio or set-top box, is provided with a micro-controller having a CPU, non-volatile memory and a reading device. A removable recording medium bearing one or more files containing program instructions is loaded into the reading device. The device determines whether the files stored on the recording medium relate to data or program instructions. If the files relate to data then these are output in the usual manner. If the files contain program instructions then these instructions are loaded into a re-writable memory within the consumer product and are executed. Files not relevant to the consumer product are ignored. In certain embodiments, files determined to be old are also ignored.

In GB 2400194A it is assumed that the files contained upon the removable recording medium are the correct files for upgrading the consumer product, however, ensuring this is unnecessarily complex and frustrating for consumers. Consumers are forced to identify and download the exact files required by the consumer product in question. In an attempt to provide a more sensible and simple manner of upgrading software on consumer products to consumers the inventors devised the present invention.

BRIEF SUMMARY OF THE INVENTION

It would be advantageous to achieve a more consumer friendly manner of upgrading software in consumer products.

Accordingly, there is provided, in a first aspect of the present invention, a method for upgrading software in a consumer product, the method comprising detecting insertion of a non-volatile storage device into the consumer product, storing predetermined information regarding the consumer product on the non-volatile storage device, detecting insertion of the non-volatile storage device into a computer product, executing a computer program on the computer product to acquire upgrade software for the consumer product using the predetermined information, storing the upgrade software for the consumer product on the non-volatile storage device, detecting re-insertion of the non-volatile storage device into the consumer product and upgrading the software in the consumer product using the upgrade software acquired.

According to a second aspect of the invention, there is provided, a consumer product with upgradeable software, the consumer product comprising a means for writing predetermined information regarding the consumer product on a non-volatile storage device, a means for reading from the non-volatile storage device upgrade software for the consumer product acquired using the predetermined information and a means for storing the upgrade software in the consumer product for execution by the consumer product.

According to a third aspect of the invention, there is provided, a non-volatile storage device for use in upgrading software in a consumer product, the device comprising a first non-volatile storage area for storing predetermined information regarding the consumer product, a second non-volatile storage area for storing a computer program used to acquire upgrade software for the consumer product using the predetermined information and a third non-volatile storage area for storing the upgrade software acquired using the computer program.

According to a fourth aspect of the invention, there is provided, a method for operating a consumer product for upgrading of software in the consumer product, the method comprising detecting insertion of a non-volatile storage device into the consumer product, storing predetermined information regarding the consumer product on the non-volatile storage device, detecting re-insertion of the non-volatile storage device into the consumer product, reading upgrade software acquired using the predetermined information for the consumer product from the non-volatile storage device and upgrading the software in the consumer product using the upgrade software read from the non-volatile storage device.

According to a fifth aspect of the invention, there is provided, a method for operating a computer product for upgrading of software in a consumer product, the method comprising detecting insertion of a non-volatile storage device into the computer product, reading predetermined information regarding the consumer product from the non-volatile storage device, executing a computer program on the computer product to acquire upgrade software for the consumer product using the predetermined information and storing the upgrade software for the consumer product on the non-volatile storage device.

According to a sixth aspect of the invention, there is provided, a program element directly loadable into the memory of a programmable device, comprising software code portions for performing, when said program element is run on the device, the method of detecting insertion of a non-volatile storage device into a consumer product, storing predetermined information regarding the consumer product on the non-volatile storage device, detecting re-insertion of the non-volatile storage device into the consumer product, reading upgrade software acquired using the predetermined information for the consumer product from the non-volatile storage device and upgrading software in the consumer product using the upgrade software read from the non-volatile storage device.

According to a seventh aspect of the invention, there is provided, a computer-readable medium directly loadable into the memory of a programmable device, comprising software code portions for performing, when said code portions are run on the device, the method of detecting insertion of a non-volatile storage device into a consumer product, storing predetermined information regarding the consumer product on the non-volatile storage device, detecting re-insertion of the non-volatile storage device into the consumer product, reading upgrade software acquired using the predetermined information for the consumer product from the non-volatile storage device and upgrading software in the consumer product using the upgrade software read from the non-volatile storage device.

It has been recognized that there are two distinct phases in the upgrading of software in consumer products, namely the collation of predetermined information used to identify the correct software version to be acquired and the actual acquiring of the correct software version. By arranging for the consumer product itself to collate the predetermined information used to identify the correct software version to be acquired rather than force a user to collate the predetermined information, the burden upon the user is reduced significantly. Once collated this predetermined information may be used to acquiring the correct software version. The use of a single non-volatile storage device to both collate the predetermined information and acquire the correct software version therefore provides a sensible and simple approach to upgrade the software of consumer products.

In one embodiment a predetermined identifier may be detected on the non-volatile storage device indicating that the non-volatile storage device may be a support non-volatile storage device. The use of a predetermined identifier allows the consumer product to quickly differentiate between an arbitrary non-volatile storage device, such as a generic USB flash disk, and a non-volatile storage device to be used to upgrade software on the consumer product.

In a further embodiment the predetermined information may comprise an identifier of a product type of the consumer product. The consumer therefore no longer has to identify the product type of the consumer product from the label or product manual.

In another embodiment the predetermined information may comprise a unique identifier of the consumer product for differentiating amongst consumer products of the same product type. A consumer possessing a plurality of consumer products of the same product type no longer has to differentiate between each of the consumer products of the same product type.

In yet another embodiment the predetermined information may further comprise a version number of software currently installed on the consumer product. The consumer therefore does not need to identify the current version of software installed on the consumer product.

In an embodiment a means for reading a predetermined identifier from the non-volatile storage device may be provided, the predetermined identifier may indicate that the predetermined information regarding the consumer product should be written to the non-volatile storage device. The means for reading the predetermined identifier allows the consumer product to quickly differentiate between an arbitrary non-volatile storage device, such as a generic USB flash disk, and a non-volatile storage device to be used to upgrade software on the consumer product.

In another embodiment the non-volatile storage device may be a universal serial bus non-volatile storage device and the means for writing and the means for reading may be a universal serial bus interface. Universal serial bus non-volatile storage devices are cost effective non-volatile storage devices and are simple to interface to consumer products.

In another embodiment the non-volatile storage device may be a flash storage device or a hard disk drive device and the means for writing and the means for reading may be an interface compatible with the flash storage device or the hard disk drive device. Flash storage devices and hard disk drive devices are cost effective non-volatile storage devices and are simple to interface to consumer products with interfaces commonly applied in consumer products.

In a further embodiment the non-volatile storage device may be an optical disc and the means for writing and the means for reading may be an optical drive. In consumer products already employing optical storage such an optical disc may be used to upgrade the software on the consumer products with zero added cost to the consumer.

In an embodiment the second non-volatile storage area of a non-volatile storage device may comprise an optical storage emulation zone allowing automatic detection and execution of a computer program on a computer product. Since optical storage emulation zones provide a standardised method of automatically executing computer programs on a computer product the automatic execution of a computer program may be arranged to automatically download the correct software for the consumer product based upon predetermined information regarding the consumer product.

In a further embodiment the second non-volatile storage area may be formatted as a Compact Disc File System and/or a Hierarchical File System. These are common file systems readable upon computer products.

In another embodiment the non-volatile storage device may be an SD device, a memory stick device, a MMC device or a Compact Flash device. These are widely available flash based non-volatile storage devices.

In a further embodiment a fourth non-volatile storage area may be provided in the non-volatile storage device for storing user data. This allows a user to also store data of interest to the user in any remaining storage space not required for upgrading the software.

In another embodiment the third non-volatile storage area may comprise the first non-volatile storage area. Such an embodiment allows information regarding a consumer product and upgrade software for the consumer product to be stored together and simplifies accessibility.

In an embodiment the third non-volatile storage area may be a hidden non-volatile storage area hidden from a user during normal operation. This allows upgrade software top be protected from accidental erasure by the user during normal usage.

In a further embodiment a consumer product according to the invention may be realized as at least one of the group consisting of a Set-Top-Box device, a digital video recording device, a network-enabled device, a conditional access system, a portable audio player, a portable video player, a mobile phone, a DVD player, a CD player, a hard disk based media player, an Internet radio device, a computer, a television, a public entertainment device and an MP3 player. However, these applications are only exemplary.

The data processing required according to the invention can be realized by a computer program, that is to say by software, or by using one or more special electronic optimization circuits, that is to say in hardware, or in hybrid form, that is to say by means of software components and hardware components.

The aspects defined above and further aspects of the invention are apparent from the examples of embodiment to be described hereinafter and are explained with reference to these examples of embodiment.

BRIEF DESCRIPTION OF THE DRAWINGS

The invention will be described in more detail hereinafter with reference to examples of embodiment but to which the invention is not limited.

The Figures are schematically drawn and not true to scale, and the identical reference numerals in different Figures refer to corresponding elements. It will be clear for those skilled in the art, that alternative but equivalent embodiments of the invention are possible without deviating from the true inventive concept, and that the scope of the invention will be limited by the claims only.

DETAILED DESCRIPTION OF THE INVENTION

Figure 1:
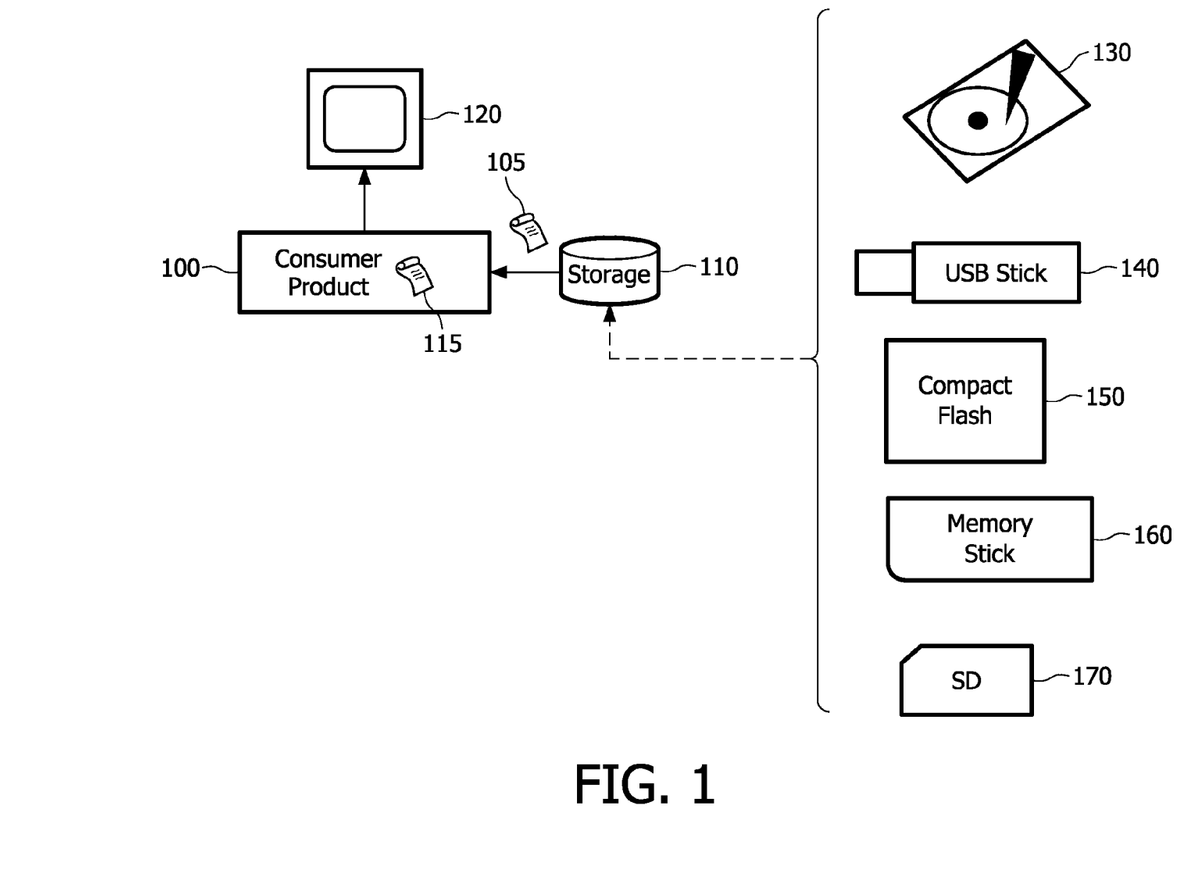
FIG. 1 illustrates a consumer product interfacing with a non-volatile storage device.

FIG. 1 illustrates a consumer product 100. The consumer product 100 may be embodied as a DVD recorder, a Set-Top-Box device, a digital video recording device, a network-enabled device, a conditional access system, a portable audio player, a portable video player, a mobile phone, a DVD player, a CD player, a hard disk based media player, an Internet radio device, a computer, a television, a public entertainment device or an MP3 player. However, these applications are only exemplary. When the consumer product 100 does not in itself provide a screen then a display 120 may be provided for rendering audio-video content. The display 120 may also incorporate speakers (not shown) to assist in the rendering of audio. Speakers may also be provided separately. It is common for software contained within the consumer product 100 to be upgraded. Such software is often termed embedded software 115 or firmware and allows the consumer product 100 to perform the normal operation expected by a user. The embedded software 115 may need to be upgraded to provide extra functionality to the user or to correct software bugs found in the embedded software 115 during testing in the field.

Since consumer products in general do not possess a direct connection to the Internet upgrading the embedded software 115 is an awkward task for the user. This normally involves the user having to identify the exact type or model number of the consumer product 100 and to identify the current version of the embedded software 115 installed on the consumer product 100. Then using a personal computer the user can acquire the latest software using a Web browser interface, before storing the latest software on a storage device to transfer it to the consumer product 100.

In FIG. 1 it is illustrated that a non-volatile storage device 110 may be used to upgrade the embedded software 115. The non-volatile storage device 110 is preferably a removable storage device. The non-volatile storage device 110 may be associated with the consumer product 100 by reading a predetermined identifier 105 from the non-volatile storage device 110. The consumer product 100 may then identify the non-volatile storage device 110 as a support non-volatile storage device. Such a support non-volatile storage device may be specifically associated with the consumer product 100 to provide support functionality to ensure that the consumer product 100 is kept up to date with the latest software release. The non-volatile storage device 110 may be sold together with the consumer product 100 or separately. The predetermined identifier 105 may be a special file. The predetermined identifier 105 may be indicated merely by a unique name of the special file or by unique data contained within the special file. Of course, many other implementations are possible. The function of the predetermined identifier 105 is to merely indicate to the consumer product 100 that the non-volatile storage device 110 should be used in relation to the support of the consumer product 100.

As illustrated in FIG. 1 the non-volatile storage device 110 may be embodied as a hard disk drive 130, a Universal Serial Bus (USB) stick 140, a Compact Flash device 150, a Memory Stick device 160 or a SD device 170. Other equivalent devices may also be used that provide non-volatile read/write storage functionality.

Figure 2:
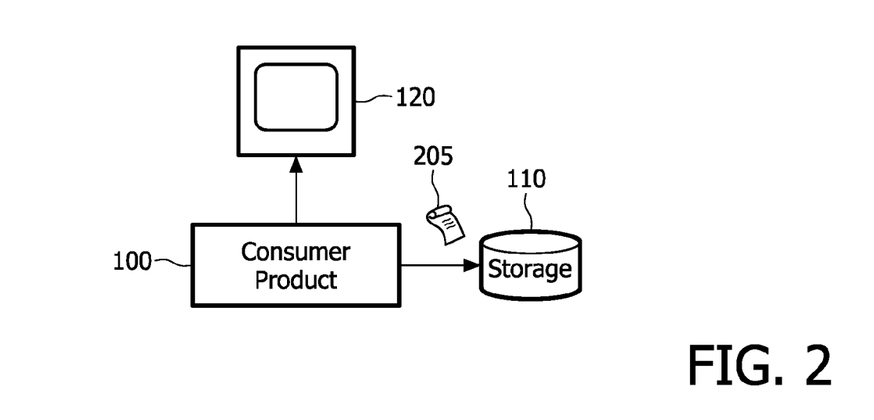
FIG. 2 illustrates a consumer product storing predetermined information regarding the consumer product on a non-volatile storage device.

In FIG. 2 the consumer product 100 is shown storing predetermined information regarding the consumer product 205 on the non-volatile storage device 110. This may occur after the non-volatile storage device 110 has been associated with the consumer product 100 or may occur with a generic non-volatile storage device. The predetermined information regarding the consumer product 205 may be a type or model number of the consumer product 100 or the version number of the embedded software 115 currently installed on the consumer product 100. The predetermined information regarding the consumer product 205 is useful to allow new software to be identified automatically for the consumer product 100. The user therefore no longer has to identify the product type of the consumer product 100 from the label or product manual. The predetermined information regarding the consumer product 205 may also comprise a unique identifier of the consumer product 100 for differentiating amongst consumer products of the same product type. A consumer possessing a plurality of consumer products of the same product type therefore no longer has to differentiate between each of the consumer products of the same product type.

Figure 3:
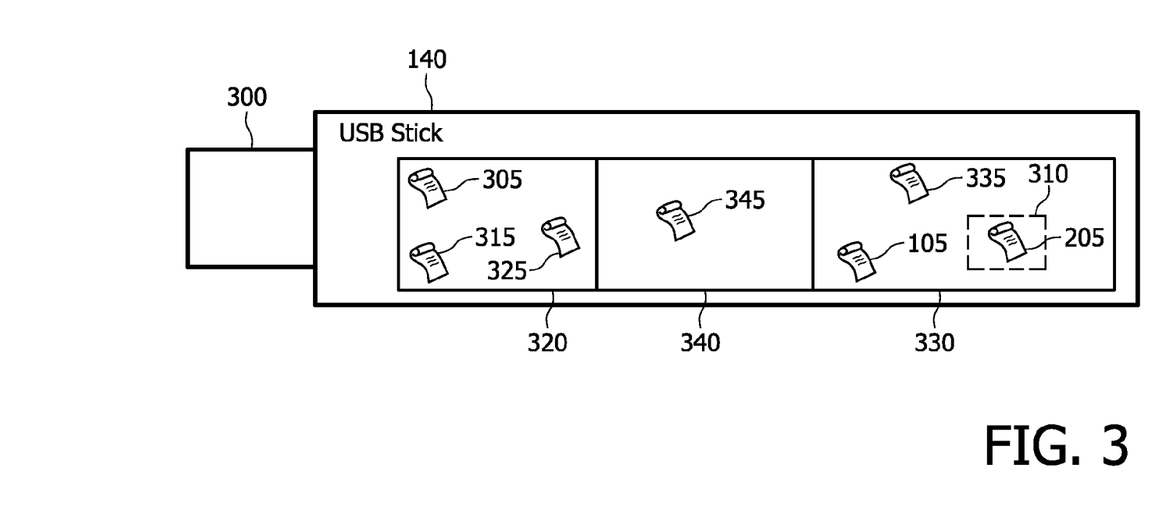
FIG. 3 illustrates the internal layout of a non-volatile storage device suitable for use in upgrading software on the consumer product.

In FIG. 3 the internal layout is shown of the non-volatile storage device 110, embodied as a USB stick 140. The USB stick 140 may be suitable for use in upgrading software on the consumer product. In FIG. 3 the USB stick 140 has a USB interface connector 300 according to the USB standard. This allows the USB stick 140 to be used in any device operating according to the USB standard. The USB stick 140 of FIG. 3 is illustrated in a state after which the USB stick 140 has been assigned to co-operate with the consumer product 110. This may be indicated by the presence of the predetermined information regarding the consumer product 205, which may be stored in a first non-volatile storage area 310. The storage space of the USB stick 140 may be partitioned into multiple partitions. In FIG. 3 three partitions or areas are shown, namely a second non-volatile storage area 320, a third non-volatile storage area 330 and a fourth non-volatile storage area 340. It is not essential that three partitions be used. The first non-volatile storage area 310 may be stored within the third non-volatile storage area 330, or elsewhere. In an initial state (not shown), i.e. before being assigned to co-operate with the consumer product 100, the predetermined information regarding the consumer product 205 will not be present in the first non-volatile storage area 310. In this state the first non-volatile storage area 310 may not even have been created yet.

The second non-volatile storage area 320 may be a CDROM emulation zone and may be read only. It may be a separate partition, where here the term partition takes on the meaning as known in the technical area of personal computers. Another term for CDROM emulation is optical storage emulation. The objective of providing CDROM emulation is to allow a computer program 325 to run automatically when the USB stick 140 is inserted into a personal computer. Some personal computer operating systems only allow optical storage devices to automatically run applications, therefore emulating a CDROM achieves the desired effect of automatically running the computer program 325. The computer program 325 may be an upgrade application that may read the predetermined information regarding the consumer product 205 from the USB stick 140. To ensure that the USB stick 140 may operate with multiple operating systems it is preferable to provide multiple file systems. For example, a Compact Disc File System (CDFS) 305 and a Hierarchical File System (HFS) 315 may both be provided. In the Compact Disc File System (CDFS) 305 a special system file named autorun.inf may be employed to allow the computer program 325 to run automatically. Access to the computer program 325 may also be provided in the Compact Disc File System (CDFS) 305. The Hierarchical File System (HFS) 315 may provide a Readme.txt file to instruct the user on how to run the computer program 325 and the Hierarchical File System (HFS) 315 may also provide access to the computer program 325. Preferably the size of the second non-volatile storage area 320 is large enough to provide for at least the Compact Disc File System (CDFS) 305 and the Hierarchical File System (HFS) 315 and the required data, such as the computer program 325.

The third non-volatile storage area 330 may be a hidden non-volatile storage area not normally accessible by the user. Providing a hidden non-volatile storage area ensures that the user does not accidentally erase files useful for upgrading the embedded software 115 of the consumer product 100. Preferably the third non-volatile storage area 330 would be hidden during normal use on a personal computer, but visible to the computer program 325 and on the consumer product 100. The third non-volatile storage area 330 may be accessible for reading and writing. Any file system may be used including proprietary file systems. The third non-volatile storage area 330 may be used to store the predetermined identifier 105, the first non-volatile storage area 310 and therein the predetermined information regarding the consumer product 205 and upgrade software 335. Preferably the size of the third non-volatile storage area 330 is large enough to provide for the required data items just described.

Optionally, a fourth non-volatile storage area 340 may be provided occupying all remaining storage space on the USB stick 140. The fourth non-volatile storage area 340 may be used by the user to store user data 345. The fourth non-volatile storage area 340 may therefore operate as a normal flash drive for the user. The fourth non-volatile storage area 340 may be accessible for reading and/or writing as desired by the user.

Figure 4A:
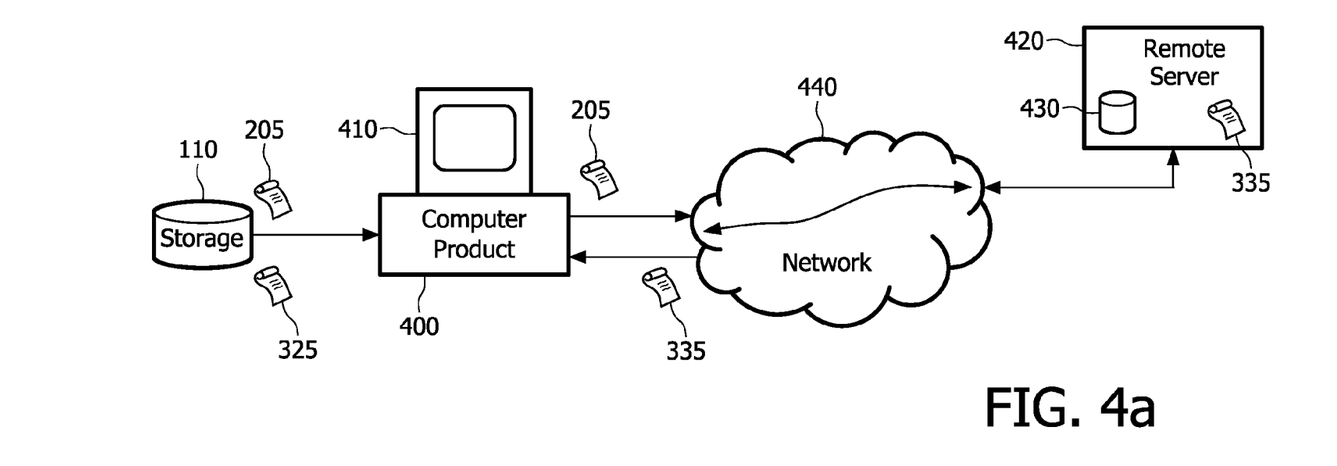
FIG. 4a illustrates a computer product interfacing with a non-volatile storage device to acquire upgrade software from a remote server.

In FIG. 4a the non-volatile storage device 110, such as embodied by the USB stick 140, has been transferred by the user to a computer product 400. The computer product 400 may be a normal personal computer and operate in the known manner. The computer product 400 may have a monitor 410 for interacting with the user. Keyboards, mice and other user interface devices (all not shown) may also be used to allow effective user interaction. The computer product 400 may interface with the non-volatile storage device 110 in the known way and automatically detect and run computer program 325 from the non-volatile storage device 110. The computer program 325 allows further access to the predetermined information regarding the consumer product 205 on the non-volatile storage device 110. The computer program 325 may then access a remote server 420 via a network 440, such as the Internet. The computer program 325 may provide the predetermined information regarding the consumer product 205 to the remote server 420 and the remote server 420 may have a software database 430 from which the remote server 420 can identify the upgrade software 335 required to upgrade the consumer product 100 to the latest software version. The upgrade software 335 may be acquired by the computer program 325 and stored upon the non-volatile storage device 110 by the computer program 325. As noted in the text relating to FIG. 3 both the predetermined information regarding the consumer product 205 and the acquired upgrade software 335 may be stored in a hidden non-volatile storage area. In this case the computer program 325 should be able to access the hidden non-volatile storage area.

Figure 4B:
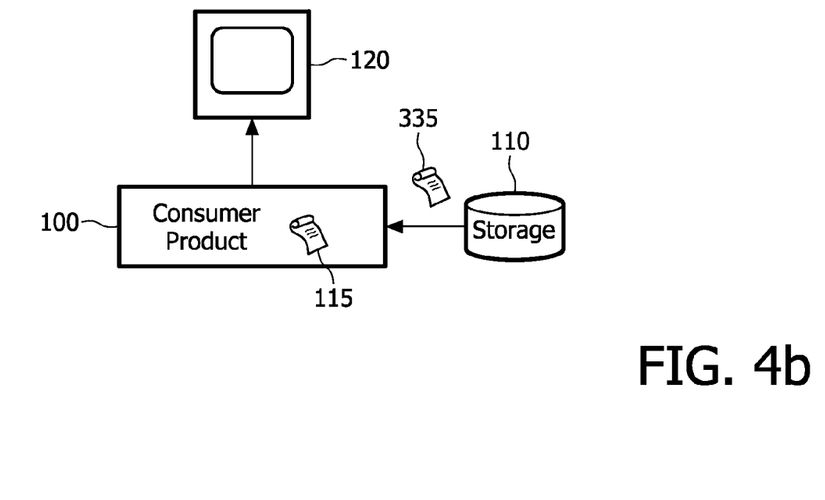
FIG. 4b illustrates a consumer product reading upgrade software from a non-volatile storage device.

In FIG. 4b the non-volatile storage device 110 is re-inserted into the consumer product 100. The upgrade software 335 may be retrieved from the non-volatile storage device 110 using the embedded software 115 already present on the consumer product 100. The consumer product 100 may then upgrade the embedded software 115 by replacing it with the upgrade software 335 either fully or partially. As far as the user is concerned the consumer product 100 has been upgraded with no more effort than inserting and removing the non-volatile storage device 110 a few times. The upgrading of the embedded software 115 was therefore achieved in a sensible and simple manner.

Figure 5:
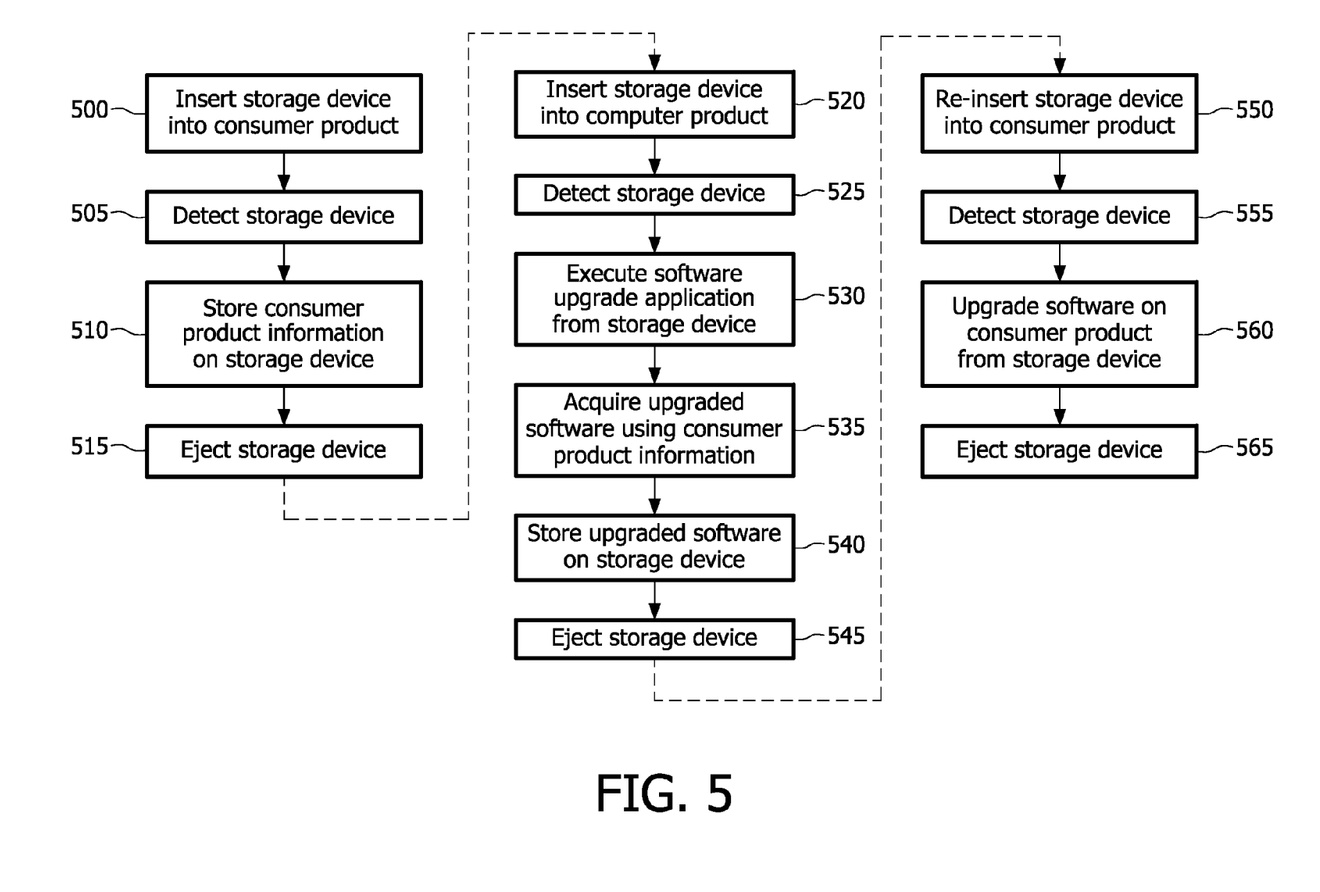
FIG. 5 illustrates a flowchart for upgrading software on a consumer product.

In FIG. 5 a flowchart is illustrated indicating numerous phases of a method in accordance with an embodiment of the invention. In the first phase, namely steps 500 though 515, the non-volatile storage device 110 co-operates with the consumer product 100. At step 500 the non-volatile storage device 110 is inserted into the consumer product 100. At step 505 the consumer product 100 detects the non-volatile storage device 110 and may further detect the predetermined identifier 105. At step 510 the predetermined information regarding the consumer product 205 may be stored on the non-volatile storage device 110. The first phase ends at step 515 where the non-volatile storage device 110 is ejected from the consumer product 100.

In the second phase, namely steps 520 though 545, the non-volatile storage device 110 co-operates with the computer product 400. At step 520 the non-volatile storage device 110 is inserted into the computer product 400. The computer product 400 detects the non-volatile storage device 110 at step 525 and may automatically run the computer program 325 from the non-volatile storage device 110 at step 530. At step 535 the computer program 325 may read the predetermined information regarding the consumer product 205 from the non-volatile storage device 110 and acquire the upgrade software 335 from the remote server 420. At step 540 the upgrade software 335 is stored upon the non-volatile storage device 110. The second phase ends at step 545 where the non-volatile storage device 110 is ejected from the computer product 400.

In the third phase, namely steps 550 though 565, the non-volatile storage device 110 again co-operates with the consumer product 100. At step 550 the non-volatile storage device 110 is re-inserted into the consumer product 100. At step 555 the consumer product 100 detects the non-volatile storage device 110 and may further detect the upgrade software 335 stored on the non-volatile storage device 110 during the second phase. At step 560 the upgrade software 335 may be read from the non-volatile storage device 110 and the embedded software 115 of the consumer product 100 may be upgraded fully or partially with the upgrade software 335. The third, and final, phase ends at step 565 where the non-volatile storage device 110 is ejected from the consumer product 100.

Figure 6:
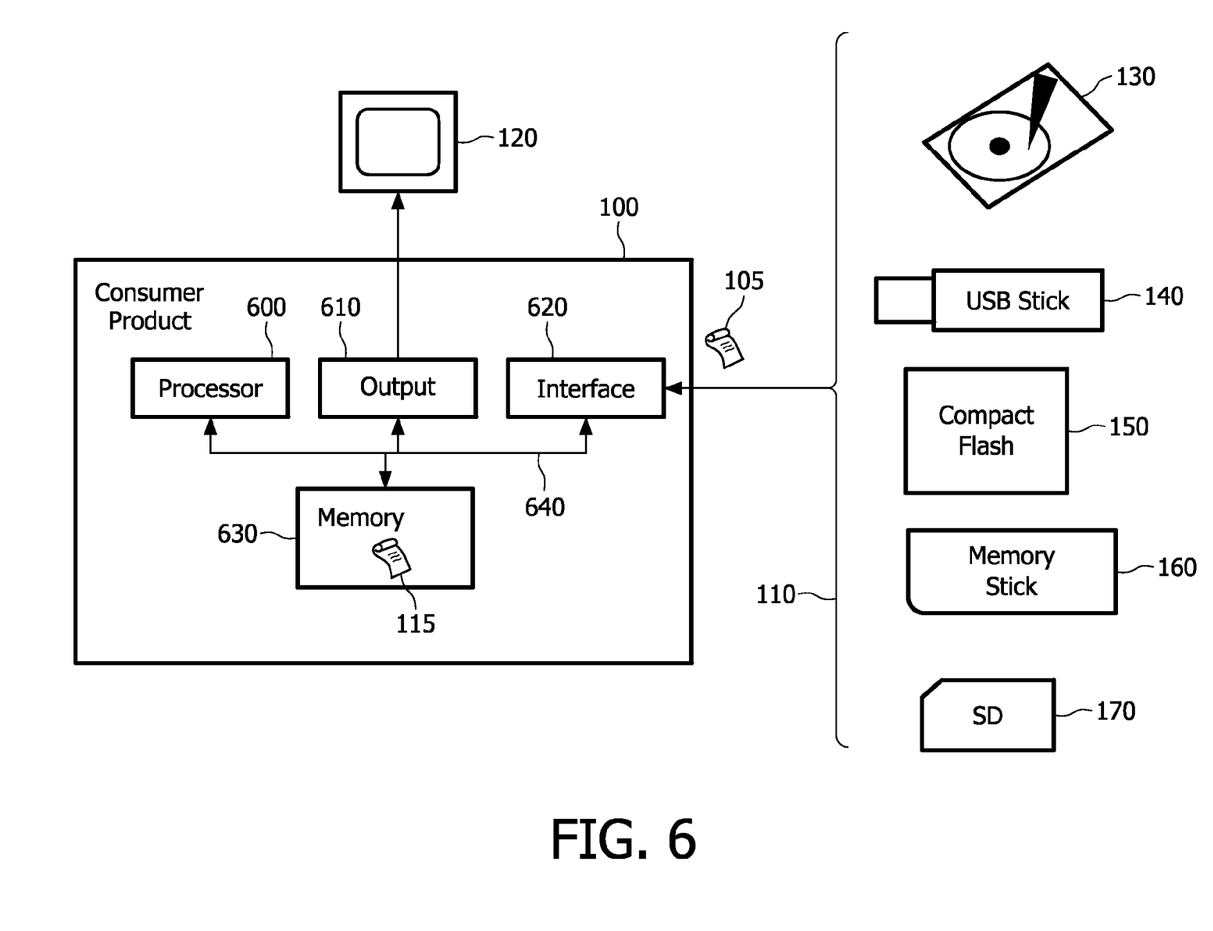
FIG. 6 illustrates the internal construction of a consumer product and a selection of embodiments of a non-volatile storage device for use in upgrading software on the consumer product.

FIG. 6 shows in more detail an embodiment of the consumer product 100. The consumer product 100 may have a microcontroller or processor 600 for executing the embedded software 115 or after an upgrade the upgrade software 335. Memory 630 may be provided to assist the processor 600 in the execution of software code. The memory 630 may be non-volatile memory such a NOR or NAND flash, or it may be a hybrid memory comprising numerous memory partitions, such as read only memory (ROM), flash memory and randomly accessible volatile memory, i.e. RAM. Other possibilities are also foreseeable. The embodiment of FIG. 6 has an interface unit 620 suitable for interfacing with the non-volatile storage device 110. The exact form of interface unit 620 depends upon the embodiment of the non-volatile storage device 110. Numerous examples of the embodiment of the non-volatile storage device 110 are shown in FIG. 6. Each form of the interface unit 620 is well known to the skilled person. An output unit 610 may be provided to generate signals necessary for the display 120. The processor 600, the memory 630, the output unit 610 and the interface unit 620 may all communicate via a bus 640. Such a system bus is commonly applied and is well known to the skilled person. The non-volatile storage device 110 as shown in FIG. 6 only illustrates the first phase of the method according to the flowchart shown in FIG. 5. In reality the processor 600 of the consumer product 100 may execute numerous steps in the method according to the flowchart shown in FIG. 5. More specifically, the processor 600 may execute the first phase and the third phase of the method according to the flowchart shown in FIG. 5.

Figure 7:
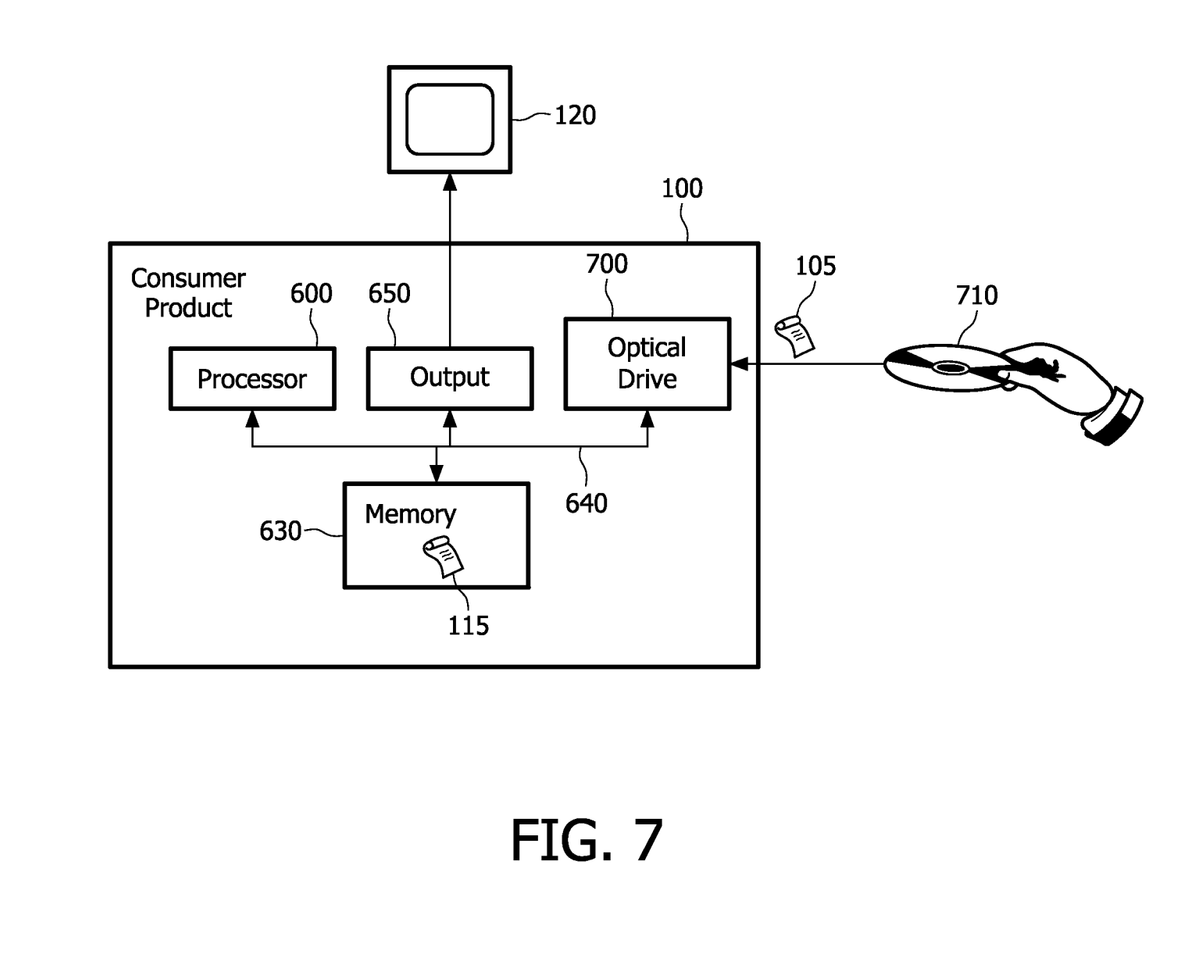
FIG. 7 illustrates the internal construction of a consumer product comprising an optical disc drive unit and an optical disc embodiment of a non-volatile storage device for use in upgrading software on the consumer product.

FIG. 7 shows in more detail a further embodiment of the consumer product 100. The consumer product 100 may comprise an optical drive 700 in place of the interface unit 620 of the embodiment of FIG. 6. Known optical drives may read and write Compact Discs, CDROM's, DVD's, DVD+/−RW, HD-DVD, Blu-Ray discs etc. In the embodiment of FIG. 7 the non-volatile storage device 110 is embodied as an optical disc 710. The non-volatile storage device 110 as shown in FIG. 7 again only illustrates the first phase of the method according to the flowchart shown in FIG. 5. The processor 600 may again execute the first phase and the third phase of the method according to the flowchart shown in FIG. 5.

In summary the invention discloses methods and devices for upgrading software in a consumer product in an automatic manner, such that a user is not required to possess detailed information about the consumer product, such as consumer product type or model number or installed software version. A non-volatile storage device and a consumer product are provided which co-operate to upgrade the software in the consumer product according to the method. The consumer product stores predetermined information regarding the consumer product on the storage device. The storage device is transferred to a computer product connected to the Internet. The predetermined information is used to acquire upgrade software from a remote server automatically without the user requiring detailed knowledge of the consumer product. The upgrade software is stored on the storage device, which is then transferred back to the consumer product. The consumer product upgrades the software installed on the consumer product using the upgrade software.

It should be noted that the above-mentioned embodiments illustrate rather than limit the invention, and that those skilled in the art will be capable of designing many alternative embodiments without departing from the scope of the invention as defined by the appended claims. Furthermore, any of the embodiments described comprise implicit features, such as, an internal current supply, for example, a battery or an accumulator. In the claims, any reference signs placed in parentheses shall not be construed as limiting the claims. The word "comprising" and "comprises", and the like, does not exclude the presence of elements or steps other than those listed in any claim or the specification as a whole. The singular reference of an element does not exclude the plural reference of such elements and vice-versa. In a device claim enumerating several means, several of these means may be embodied by one and the same item of hardware. The mere fact that certain measures are recited in mutually different dependent claims does not indicate that a combination of these measures cannot be used to advantage.

The invention claimed is:

1. A method for upgrading software in a consumer product, the method comprising acts of:
 upon insertion of a non-volatile storage device into the consumer product,
  detecting a predetermined identifier on the non-volatile storage device inserted into the consumer product, the predetermined identifier indicating that the non-volatile storage device supports functionality of the consumer product;
  storing predetermined information regarding the consumer product on the non-volatile storage device when the predetermined identifier is detected, wherein the predetermined information comprises an identifier of a product type of the consumer product;
 upon insertion of the non-volatile storage device into a computer product,
  acquiring, by a computer program on the computer product, upgrade software for the consumer product based on the predetermined information read from the non-volatile storage device;
  storing the upgrade software for the consumer product on the non-volatile storage device; and
 upon re-insertion of the non-volatile storage device into the consumer product,
  upgrading the software in the consumer product using the acquired upgrade software,
 wherein the non-volatile storage device comprises:
  a first non-volatile storage area for storing predetermined information regarding the consumer product;
  a second non-volatile storage area for storing a computer program used to acquire upgrade software for the consumer product using the predetermined information;

a third non-volatile storage area for storing the upgrade software acquired using the computer program, wherein the third non-volatile storage area is a hidden non-volatile storage area hidden from a user during normal operation; and a fourth non-volatile storage area for storing user data.

2. The method of claim 1, wherein the predetermined information further comprises a unique identifier of the consumer product for differentiating amongst consumer products of the same product type.

3. The method of claim 1, wherein the predetermined information further comprises a version number of software currently installed on the consumer product.

4. A consumer product with upgradeable software, the consumer product comprising: a processor configured to, upon insertion of a non-volatile storage device into the consumer product, detect a predetermined identifier on the non-volatile storage device inserted into the consumer product, the predetermined identifier indicating that the non-volatile storage device supports functionality of the consumer product, write predetermined information regarding the consumer product on the non-volatile storage device when the predetermined identifier is detected, wherein the predetermined information comprises an identifier of a product type of the consumer product; and a reader configured to read from the non-volatile storage device upgrade software for the consumer product for execution by the consumer product acquired using the predetermined information when the non-volatile storage device is inserted into a computer product, wherein the non-volatile storage device comprises:

a first non-volatile storage area for storing predetermined information regarding the consumer product;

a second non-volatile storage area for storing a computer program used to acquire upgrade software for the consumer product using the predetermined information;

a third non-volatile storage area for storing the upgrade software acquired using the computer program, wherein the third non-volatile storage area is a hidden non-volatile storage area hidden from a user during normal operation; and a fourth non-volatile storage area for storing user data.

5. The consumer product of claim 4, wherein the non-volatile storage device is a universal serial bus non-volatile storage device and the processor and the reader have a universal serial bus interface.

6. The consumer product of claim 4, wherein the non-volatile storage device is a flash storage device or a hard disk drive device and the processor and the reader have an interface compatible with the flash storage device or the hard disk drive device.

7. The consumer product of claim 4, wherein the non-volatile storage device is an optical disc and the processor and the reader are connected to an optical drive.

8. The consumer product of claim 4, wherein the consumer product comprises at least one of a Set-Top-Box device; a digital video recording device; a network-enabled device; a conditional access system; a portable audio player; a portable video player; a mobile phone; a DVD player; a CD player; a hard disk based media player; an Internet radio device; a television; a public entertainment device; and an MP3 player.

9. The consumer product of claim 4, wherein the non-volatile storage device is a universal serial bus non-volatile storage device.

10. The consumer product of claim 9, wherein the second non-volatile storage area comprises an optical storage emulation zone for allowing automatic detection and execution of the computer program on a computer product.

11. The consumer product of claim 4, wherein the non-volatile storage device is selected from a flash storage device and a hard disk drive device.

12. The consumer product of claim 4, wherein the non-volatile storage device is an optical disc.

13. The consumer product of claim 4, wherein the second non-volatile storage area is formatted as at least one of a Compact Disc File System and a Hierarchical File System.

14. The consumer product of claim 4, wherein the non-volatile storage device is a secure digital (SD) device, a memory stick device a multimedia card (MMC) device or a Compact Flash device.

15. The consumer product of claim 4, wherein the third non-volatile storage area comprises the first non-volatile storage area.

16. A computer-readable non-transitory medium loadable into a programmable device and comprising software code portions for performing, when said code portions are run on the device, a method comprising acts of:

upon insertion of a non-volatile storage device into a consumer product, detecting a predetermined identifier on the non-volatile storage device inserted into the consumer product, the predetermined identifier indicating that the non-volatile storage device supports functionality of the consumer product;

storing predetermined information regarding the consumer product on the non-volatile storage device when the predetermined identifier is detected, wherein the predetermined information comprises an identifier of a product type of the consumer product;

upon re-insertion of the non-volatile storage device into the consumer product, reading upgrade software acquired using the predetermined information when the non-volatile storage device is inserted into a computer product; and upgrading software in the consumer product using the upgrade software read from the non-volatile storage device, wherein the non-volatile storage device comprises:

a first non-volatile storage area for storing predetermined information regarding the consumer product;

a second non-volatile storage area for storing a computer program used to acquire upgrade software for the consumer product using the predetermined information;

a third non-volatile storage area for storing the upgrade software acquired using the computer program, wherein the third non-volatile storage area is a hidden non-volatile storage area hidden from a user during normal operation; and a fourth non-volatile storage area for storing user data.

* * * * *